United States Patent
Muhonen et al.

(10) Patent No.: US 7,327,724 B2
(45) Date of Patent: Feb. 5, 2008

(54) METHOD, NETWORK DEVICE, AND TERMINAL DEVICE FOR CONTROLLING CONTEXT ACTIVATION

(75) Inventors: Ahti Muhonen, Hirvihaara (FI); Jonne Soininen, Helsinki (FI); Jens Staack, Ojakkala (FI)

(73) Assignee: Nokia Corporation, Espoo (FI)

( * ) Notice: Subject to any disclaimer, the term of this patent is extended or adjusted under 35 U.S.C. 154(b) by 609 days.

(21) Appl. No.: 10/479,003

(22) PCT Filed: May 22, 2001

(86) PCT No.: PCT/EP01/05881

§ 371 (c)(1),
(2), (4) Date: Apr. 6, 2004

(87) PCT Pub. No.: WO02/096133

PCT Pub. Date: Nov. 28, 2002

(65) Prior Publication Data

US 2005/0033860 A1    Feb. 10, 2005

(51) Int. Cl.
H04L 12/66    (2006.01)

(52) U.S. Cl. .................. 370/356; 370/352; 370/353; 370/338

(58) Field of Classification Search ................ 370/356, 370/352, 353, 354, 355, 401, 338, 469, 349, 370/392, 389, 386, 414; 455/572
See application file for complete search history.

(56) References Cited

FOREIGN PATENT DOCUMENTS

| GB | 2337423 A | 11/1999 |
| JP | 11313083 | 11/1999 |
| JP | 2000354067 | 12/2000 |
| WO | WO 0078080 | 12/2000 |
| WO | WO 0128160 A | 4/2001 |

*Primary Examiner*—Melur Ramakrishnaiah
(74) *Attorney, Agent, or Firm*—Lackenbach Siegel LLP; Robert M. Bauer

(57) ABSTRACT

The present invention relates to a method, a network device (2), and a terminal device (1) for controlling the activation of packet data protocol context in a network supporting packet switched transmission of data units. A push information element HSS Push IE is added to a data base (4') containing information to control push services. This push information element Push IE is sent to a network device (2) with a support node functionality. This push information element is evaluated. Thus, network requested context activation procedures is controlled to thereby reduce the number of unnecessary context activations.

18 Claims, 5 Drawing Sheets

METHOD, NETWORK DEVICE, AND TERMINAL DEVICE FOR CONTROLLING CONTEXT ACTIVATION

FIELD OF THE INVENTION

The present invention relates to a method, network device and terminal device for controlling the activation of a packet data protocol context in a network supporting packet switched transmission of data units such as a GPRS or UMTS network.

BACKGROUND OF THE INVENTION

In common mobile communication networks two main techniques for a data transmission are used: circuit switched data transmission and packet switched data transmission. In the circuit switched domain a network establishes an interconnection for data transmission by allocating a radio channel to a mobile station, when a network host or service provider intends to transmit data via the network. Then data is transmitted via the network after the interconnection has been established. The radio channel is occupied by the mobile station during the entire duration of the interconnection, even though in many cases only a small amount of data has to be transmitted. However, regularly a subscriber is charged for the entire duration of the interconnection. This type of circuit switched data transmission is used in GSM (Global System for Mobile communications) networks.

In the packet switched domain the network transmits a data packet only when required, i.e. when data transmission has to be carried out. Thus, several mobile stations can use the same radio channel at a time. If a mobile station generates a data packet, the network routes that packet via a first unattached radio channel to a recipient. Thus, as data transmission frequently consists of data bursts, the radio channels can be used in an efficient manner. This type of packet switched data transmission is used in GPRS (General Packet Radio Service) systems.

However, the GPRS system may be provided as an additional service in existing GSM systems. Thus, a network develops that supports circuit switched as well as packet switched data transmission.

Recent packet data mobile stations enable access to the internet and to intranets. Therefore, the GPRS data transmission uses particularly the internet protocol (IP). If a mobile station is attached to a GPRS system and a PDP (Packet Data Protocol) context is activated, a terminal equipment is able to send data packets via the mobile station to the uplink. Vice versa, a host can use the downlink to send data packets to the terminal equipment. These data packets are routed by a gateway GPRS support node (GGSN) and a serving GPRS support node (SGSN) to the correct addresses.

However, before sending data packets the mobile station has to carry out a GPRS attach and a PDP context activation. The GPRS attach informs the network that the mobile station is available. The attach is established by the mobile station and the SGSN.

Furthermore, after the GPRS attach is established, the mobile station carries out a PDP context activation. The PDP context activation makes the mobile station known to the corresponding GGSN. Thereupon, data transmission via the GGSN to external networks is enabled.

Such PDP context activation may be requested by either the network or the mobile station. In GPRS systems and UMTS (Universal Mobile Telecommunications System), as described in technical specification "ETSI TS 123 060, V3.2.1 (2000-01)" published by the European Telecommunications Standards Institute, a network requested PDP context activation is used, when a GGSN receives a data packet to an address the corresponding mobile station has no PDP context active for. The GGSN sends a PDU (Protocol Data Unit) notification request to the mobile station, which decides based on the information contained in that request whether it wants to activate the PDP context in question or not.

However, in numerous cases a context activation is not desired from the mobile station point-of-view. In these cases the PDP context activation is refused or deactivated immediately by the mobile station. However, this is disadvantageously since a large amount of unnecessary PDP context activations is generated.

SUMMARY OF THE INVENTION

It is therefore an object of the present invention to reduce the amount of context activations.

This object is achieved by a method for controlling the activation of a packet data protocol context in a network supporting packet switched transmission of data units, comprising the steps of: storing a data base push information element in a data base, sending a routing information request from a network device to said data base, said routing information being destined for routing a data unit received by said network device from the network to a terminal device, receiving by said network device a routing information response from said data base, and evaluating said routing information response with regard to said data base push information element, said data base push information element containing information for controlling push services.

Furthermore, the above object is achieved by a network device for controlling the activation of a packet data protocol context in a network supporting packet switched transmission of data units comprising generation means for generating a routing information request, the routing information being destined for routing a data unit received by said network device from the network to a terminal device, transceiver means for sending said routing information request to a data base storing said routing information and for receiving a routing information response from said data base, and evaluation means for evaluating said routing information response with regard to a data base push information element being stored in said data base, said data base push information element containing information for controlling push services.

Furthermore, the above object is achieved by a terminal device for controlling the activation of a packet data protocol context in a network supporting packet switched transmission of data units comprising transceiver means for receiving a request for activating said packet data protocol context by sending a corresponding message, and decision means for deciding whether or not to activate a packet data protocol context, and evaluation means for evaluating said request with regard to a push information element for controlling push services, said element being contained in said request, said decision means being designed to decide whether or not to activate a packet data protocol context on the basis of said push information element.

The main idea of the present invention is to provide an extra information regarding so-called push services, namely said push information element. A push service is defined as a service which is initiated from the network side and not by the user of the terminal device, e.g. a proactive delivery of information from a GPRS support node (GSN) such as a GGSN or any other gateway, such as a WAP (Wireless Application Protocol) gateway, to a terminal device or a mobile terminal, such as a WAP terminal. This extra information allows a screening process with regard to the establishing of context activation. Thus, unnecessary PDP context activation can be reduced. Such a reduction saves network resources and thus saves costs.

Preferably, the network device decides in a first phase of the screening process based on the evaluation of the routing information response whether or not to send a data unit notification request from the network device to the terminal device or to a serving support node serving the terminal device. In this phase the number of PDP context activations is reduced by a first amount.

Preferably, the terminal device uses in a second phase of the screening process a network device push information element contained in a data unit notification request or a packet data control context activation request sent from a serving support node to the terminal device to decide whether or not to activate a PDP context. Thus, the number of PDP context activations is reduced by a second amount.

Advantageous developments are defined in the dependent claims.

BRIEF DESCRIPTION OF THE DRAWINGS

In the following, the present invention will be described in greater detail based on preferred embodiments with reference to the accompanying drawings, in which.

DESCRIPTION OF THE PREFERRED EMBODIMENTS

Figure 1:
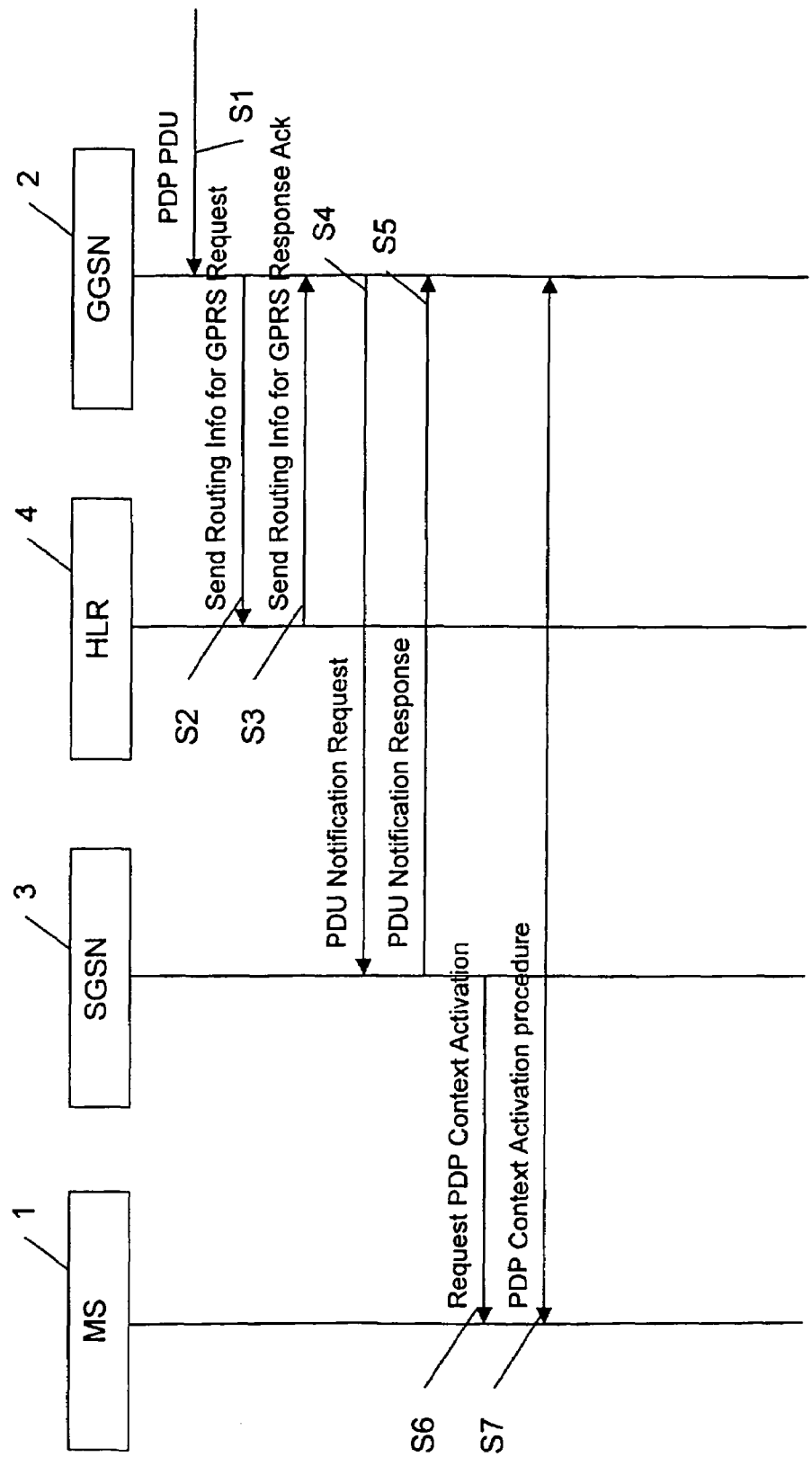
FIG. 1 shows a prior art network requested PDP context activation procedure.

FIG. 1 shows a network requested PDP context activation procedure with a packet switched attached terminal device embodied as a mobile station (MS) 1 for use in a GPRS system. The MS 1 consists of a mobile terminal and a terminal equipment. Both, mobile terminal and terminal equipment can be embodied in different devices or can be integrated in a single device.

Furthermore, a network device is provided as a part of the GPRS system, the network device being embodied as a support node (SN) namely a GPRS support node (GSN), in particular as a GGSN 2. The GGSN is a node that is accessed by a packet data network due to the evaluation of a PDP address. It contains routing information for attached GPRS users. The routing information is used to tunnel N-PDUs to the MS's current point of attachment, i.e. a SGSN 3. The GGSN 2 may request location information from a data base, namely a home locator register (HLR) 4. The GGSN 2 is the first point of packet data network (PDN) interconnection with a GSM public land mobile network (PLMN) supporting GPRS. The SGSN 3 is a node that is serving the MS 1. The SGSN 3 supports GPRS and/or UMTS. At GPRS attach, the SGSN 3 establishes a mobility management context containing information pertaining to e.g., mobility and security for the MS 1. At PDP context activation, the SGSN 3 establishes a PDP context, to be used for routing purposes, with the GGSN 2 that the subscriber will be using.

The SGSN 3 and GGSN 2 functionalities may be combined in the same physical node, or they may reside in different physical nodes. SGSN 3 and GGSN 2 contain IP or other routing functionality, and they may be interconnected with IP routers. When SGSN 3 and GGSN 2 are in different PLMNs, they are interconnected via a suitable interface, namely a so-called Gp interface.

The HLR 4 contains UMTS and GPRS (packet domain) subscriber information such as data, routing and location information enabling the charging and routing of calls towards the mobile services switching center (MSC) where the MS 1 is located. Thus, the HLR 4 implements a network function to which a mobile subscriber is assigned in its home network and which is used for storing subscriber information.

A network requested PDP context activation procedure as depicted in FIG. 1 is described hereinafter.

The network requested PDP context activation procedure allows the GGSN 2 to initiate the activation of a PDP context. When receiving a PDP PDU the GGSN 2 checks if a PDP context is established for that PDP address. If no PDP context has been established previously the GGSN 2 tries to deliver the PDP PDU by initiating the network requested PDP context activation procedure. The criteria used by the GGSN 2 to determine whether trying to deliver the PDP PDU to the MS 1 is based on subscription information.

To support network requested PDP context activation the GGSN 2 needs static PDP information about the PDP address. To determine whether network requested PDP context activation is supported for a PDP address the GGSN 2 checks if there is static PDP information for that PDP address. After performing these checks the GGSN initiates the network requested PDP context activation procedure.

In step S1 the GGSN 2 receives a PDP PDU. Thereupon, the GGSN 2 determines if the network requested PDP context activation procedure has to be initiated. The GGSN 2 is equipped with the ability of storing subsequent PDP PDUs received for the same PDP address.

In step S2, after the GGSN 2 has determined to initiate the context activation procedure, the GGSN 2 sends a routing information for GPRS request message, namely for the international mobile subscriber identity (IMSI) of the MS 1.

In step S3 the HLR 4 returns a routing information for GPRS response message, if the HLR 4 determines that the request according to S2 can be served. This response message is directed to the GGSN 2. It contains preferably the IMSI, the SGSN address, and a "mobile-station-not-reachable-reason" parameter. The "mobile station not reachable reason" parameter is included to the response message if a MNRG (Mobile Station Not Reachable for GPRS) flag is set in the HLR 4. The "mobile-station-not-reachable-reason" parameter indicates the reason for the setting of the MNRG flag as stored in the MNRR (Mobile Station Not Reachable Reason) record. If the MNRR record indicates a reason other then "No Paging Response", the HLR 4 includes the GGSN number in the GGSN list of the subscriber.

In case of the HLR 4 determining that the request according to step S2 cannot be served, e.g. if the IMSI is unknown in the HLR 4, the HLR 4 sends a routing information for GPRS response message, including IMSI and MAP (Mobile Application Part) error cause. MAP error cause indicates the reason for the negative response.

The GGSN 2 sends a PDU notification request message to the SGSN 3 indicated by the HLR 4, if the SGSN address is present and either "mobile-station-not-reachable-reason" is not present or "mobile-station-not-reachable-reason" indicates "No Paging Response". The PDU notification request includes the IMSI, a PDP type, the PDP address and an access point name (APN). Otherwise, the GGSN 2 sets the MNRG flag for that MS 1. According to step S5 the SGSN 3 returns a PDU notification response message to the GGSN 2 in order to acknowledge that it shall request the MS 1 to activate the PDP context indicated with the PDP address.

According to step S6 the SGSN 3 sends a request PDP context activation message to request the MS 1 to activate the indicated PDP context. This PDP context activation message contains the PDP type, the PDP address and the APN.

Indicated by step S7 the PDP context is finally activated with a final PDP context activation procedure.

Figure 2:
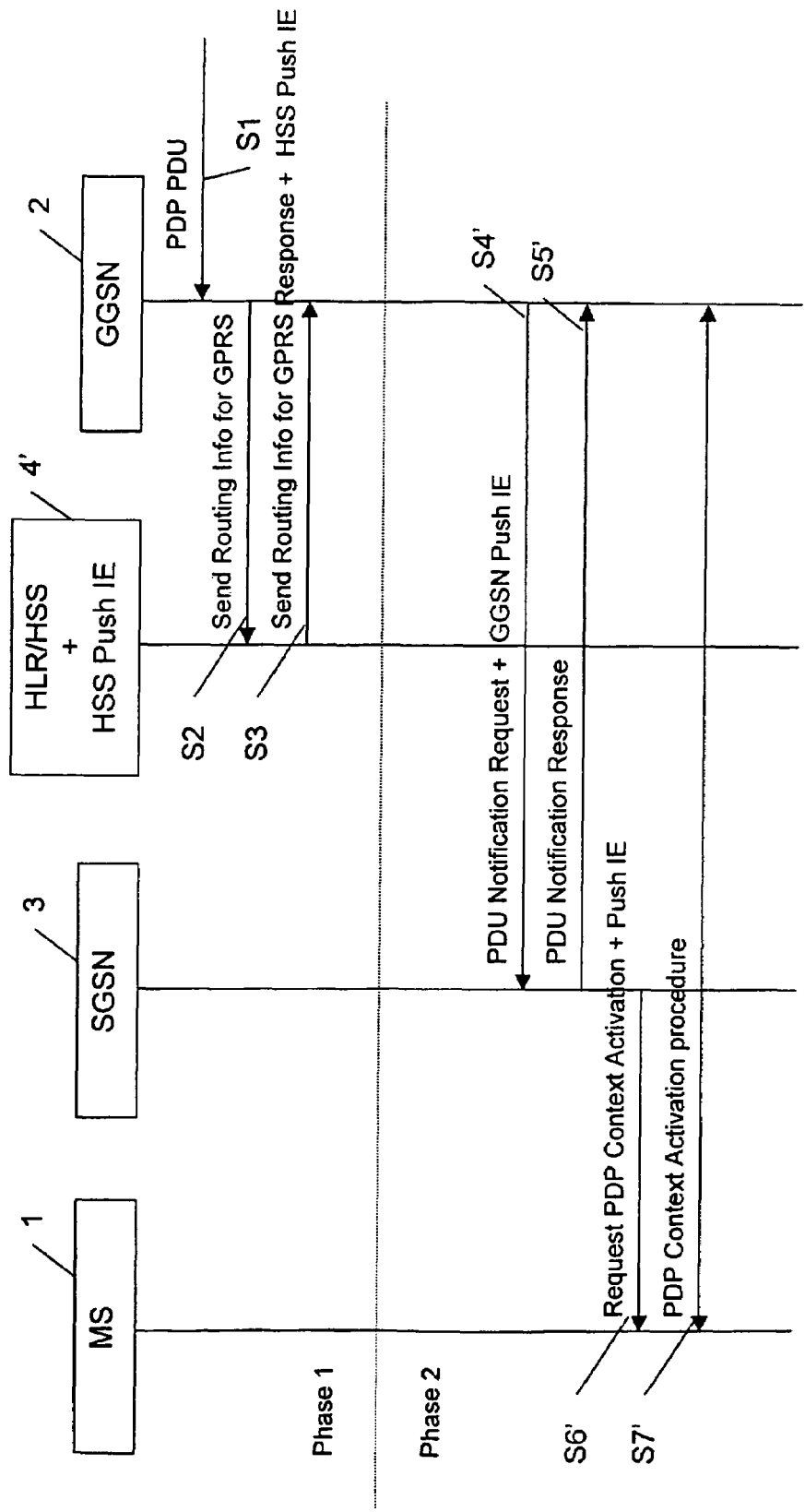
FIG. 2 shows a network requested PDP context activation procedure according to a first embodiment of the present invention.

FIG. 2 shows the network requested PDP context activation procedure according to a first embodiment of the invention. In particular, if a push service is intended to be initiated from the network side and not by the user of the mobile terminal, such a service might be undesirable from the point-of-view of the user of the mobile station and thus being blocked or such a service might be inadmissible from the point-of-view of the network side, e.g. if a service is deactivated due to unpaid bills.

In such cases, even though a server/host is trying to activate a PDP context, such a PDP context activation shall not be established. Therefore, according to a preferred embodiment of the invention a two-phase screening process is added to the procedure described with reference to FIG. 1.

In FIG. 2 the components MS 1, GGSN 2 and SGSN 3 are the same as in FIG. 1. However, the HLR 4 is modified by adding a HSS (Home Subscriber Server) push IE (Information Element) to the HLR or the respective HSS. The HSS has the same function as the HLR but in a UMTS core network as an IP network. This is indicated in FIG. 2 by renaming block 4 to block 4'.

The HSS push IE contains information referring to push services for a certain subscriber, e.g. "No SIP (Session Initiation Protocol) push allowed" or "Only best effort type Quality of Service (QoS) connection accepted". However, the HSS push IE does not include terminal capacity type of information. A SIP is an application level protocol which is used to establish multimedia sessions or calls in a packet switched environment, e.g. GPRS.

According to phase 1, when GGSN 2 asks for routing information for the GPRS or MS 1, as being indicated by step S2, after receiving an PDP PDU, such as an IP packet, as being indicated by step S1, for an non-existing PDP context, the HLR/HSS 4' returns the HSS push IE in the routing information message according to step S3, however, only if MS 1 is reachable.

Based on the information received from the HLR/HSS 4', the GGSN 2 decides that for certain type of messages no PDU notification request is sent to the MS 1 at all. Thereby the GGSN 2 acts like if the MS 1 would have had refused the PDP context activation.

Thus, such a network requested PDP context activation procedure might be terminated after step S3 thus, avoiding a significant amount of data traffic, thereby keeping network resources free for other use.

If, however, the message type is acceptable from the HSS push IE point-of-view, it is moved to phase 2. According to step S4' a PDU notification request is sent from the GGSN 2 to the SGSN 3 including a new parameter, namely a GGSN push IE. This GGSN push IE contains information derived from the received PDP PDU (step S1), namely an IP packet, like "Source IP address" or "Application/Port number".

The SGSN 3 uses this extended information, namely GGSN push IE to decide whether or not to send a PDU notification response in step S5' to GGSN 2, and if such response is sent, then it may be amended by an information corresponding to the GGSN push IE. Furthermore, the SGSN 3 sends a PDP context activation request in step S6' including an extra information according to the GGSN push IE. Thus, the MS 1 can use this extra information to decide whether or not to activate PDP context.

In conclusion, due to the HSS push IE stored in the HLR/HSS 4' the GGSN 2, the SGSN 3, and/or the MS 1 can decide based on this extra information of the push IE whether or not to activate a PDP context. If however, the GGSN 2 decides that no PDP context is to be activated, then all data traffic according to the steps S4', S5', S6' and S7' is avoided. If, however, the GGSN 2 decides to continue with the context activation, then at least MS 1 can decide, based on the extra information of the push IE transmitted from the SGSN 3 to the MS 1 during step S6' whether or not to finally activate PDP context by a final PDP context activation procedure according to step S7'. Thus, the final decision whether or not to activate PDP context is left to the MS 1.

Figure 3:
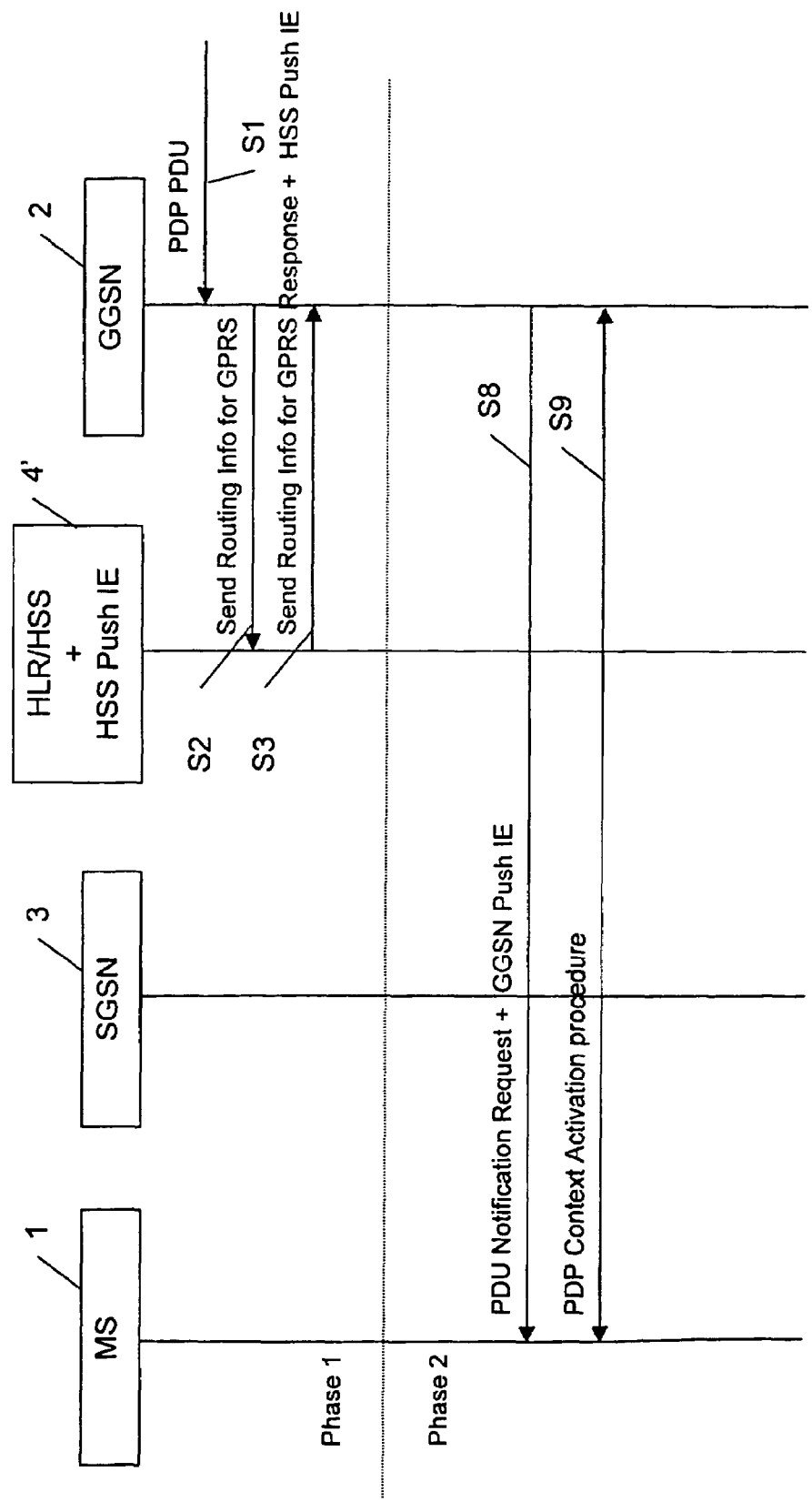
FIG. 3 shows a network requested PDP context activation procedure according to a second embodiment of the present invention.

FIG. 3 shows a further embodiment of the invention. MS 1, GGSN 2, SGSN 3 and HLR/HSS 4' are the same as in FIG. 2. Furthermore, the steps S1, S2 and S3 are the same as in FIG. 2. However, according to FIG. 3, the PDU notification request including the GGSN push IE is not sent to the SGSN 3 but directly to the MS1 as indicated by step S8. Thus, the MS 1 uses directly the GGSN push IE to decide whether to activate PDP context or not. If the MS 1 decides to activate PDP context then a final PDP context activation procedure according to step S9 is carried out.

Figure 4:
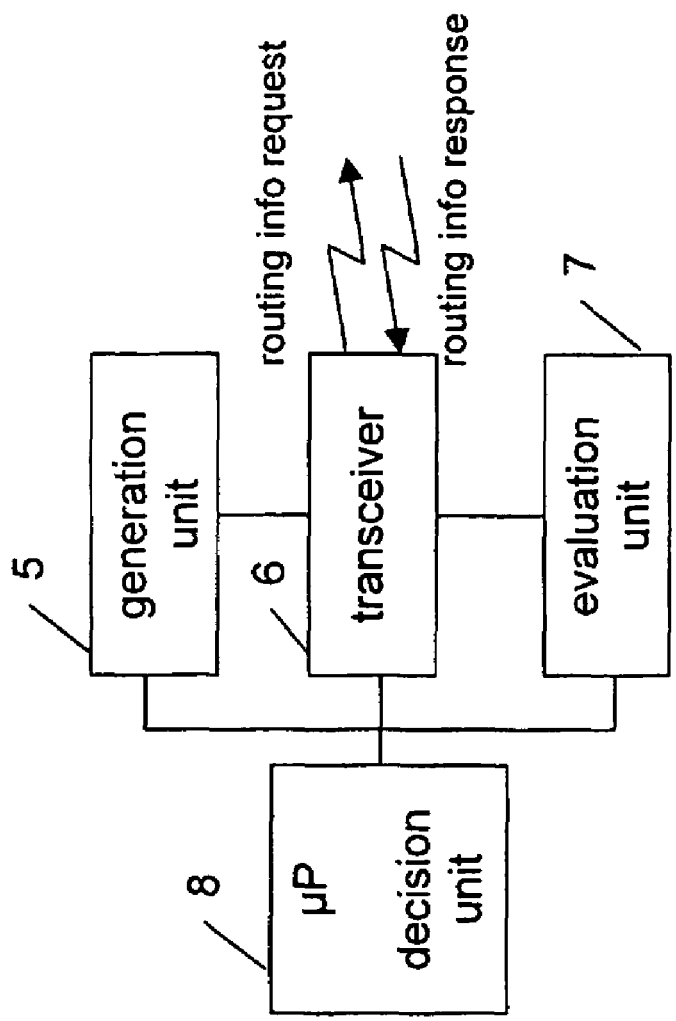
FIG. 4 shows a schematic block diagram of a network device according a preferred embodiment of the present invention.

FIG. 4 shows a schematic block diagram of a network device implementing the functionalities of a support node such as GGSN 2 and/or SGSN 3 for controlling the activation of a PDP context. This network device comprises a generation unit 5 such as a programmable microcontroller, integrated circuit or functionality for generating a routing information request to the HLR 4. The generation unit 5 is connected with a transceiver 6 for sending the generated routing information request to HLR/HSS 4'. The routing information response sent from the HLR/HSS 4' to the network device is received by the transceiver 6 and evaluated by an evaluation unit 7 such as a programmable microcontroller, integrated circuit or functionality being connected to the transceiver 6. The evaluation unit 7 is designed for evaluating said routing information response received by the transceiver 6 with regards to the HSS push IE that is expected in the routing information response. According to the HSS push IE information referring to the push services for the subscriber, a decision unit as a microprocessor 8 decides based on the evaluation unit 7 whether or not to send a PDU notification request to the MS 1 or to the SGSN 3 serving the MS 1. The microprocessor 8 is connected with the generation unit 5, the transceiver 6 and the evaluation unit 7 in order to coordinate the actions taken by these units/devices.

Figure 5:
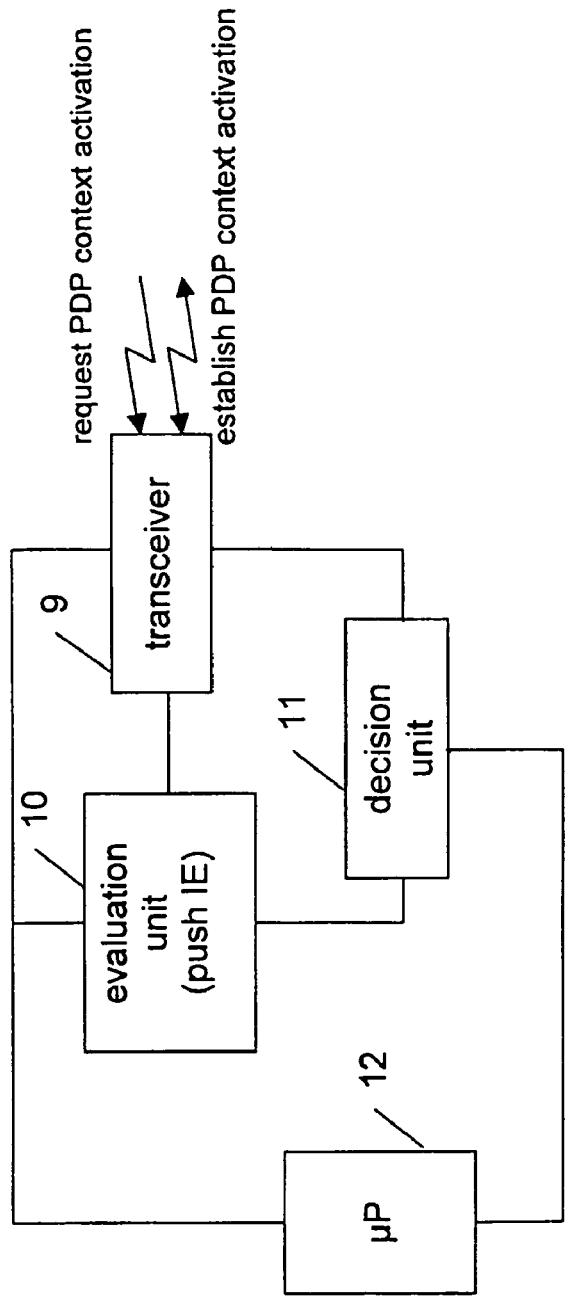
FIG. 5 shows a schematic block diagram of a terminal device according to a preferred embodiment of the present invention.

FIG. 5 shows a schematic block diagram of a terminal device, as a MS 1 provided with the ability for controlling the activation of a PDP context. This terminal device comprises a transceiver 9 for receiving a request for PDP context activation. The transceiver 9 is connected with an evaluation unit 10 such as a programmable microcontroller, integrated circuit or functionality being designed for evaluating said received PDP context activation request with regards to a GGSN push IE. This GGSN push IE is extracted from the PDP context activation request and directed to a decision unit 11 such as a programmable microcontroller, integrated circuit or functionality being connected to the evaluation unit 10. The decision unit 11 is programmed to decide whether or not to activate a PDP context on the basis of the received push IE. If the decision is positive, i.e. if a PDP context activation shall be carried out, a corresponding message is sent via a connection between the decision unit 11 and the transceiver 9 to the transceiver 9 and then to the GGSN 2. The transceiver 9, the evaluation unit 10 and the decision unit 11 are connected to a microprocessor 12 coordinating the actions between these units/devices.

The invention allows to reduce unnecessary PDP context activation in packet switched networks as well as in combined packet switched and circuit switched networks such as GPRS systems integrated in GSM networks by providing extra information to the HLR/HSS data base. Sending this extra information, like source IP address/port number to the MS is advantageously as it allows the MS to reject the context immediately, e.g. because no application is associated with the port number of the IP packet or PDP PDU. As a result the invention keep networks resources free for other use.

It is noted that the present invention is not restricted to the above described predetermined embodiment. In particular, the network device generating the network device push information element may be any device such as push proxy server, e.g. a WAP gateway. Moreover, any data base may be used to provide the push information element, and the push control service may be provided in any context activation procedure. Thus, the preferred embodiment may vary within the scope of the attached claims.

The invention claimed is:

1. A method comprising:
  a) storing a data base push information element in a data base,
  b) sending a routing information request from a network device in a network supporting packet switched transmission of data unit to said data base, said routing information being destined for routing a data unit received by said network device from the network to a terminal device,
  c) receiving said network device a routing information response from said data base, and
  d) evaluating said routing information response with regard to said data base push information element, said data base push information element containing information for controlling push services,
  e) wherein said network device decides based on said evaluation of said routing information response whether or not to send a data unit notification request for activating a packet data protocol context from said network device to said terminal device or to a serving support node serving the terminal device.

2. A method according to claim 1, wherein said network device acts like if said terminal device would have had refused the packet data protocol context activation in case of the network device having decided not to send said data unit notification request to said terminal device.

3. A method according to claim 1, wherein said network device sends a data unit notification request containing a network device push information element to said terminal device or said serving support node in case of said network device having decided that said data base push information element allows push services to the terminal device.

4. A method according to claim 3, wherein said terminal device uses said network device push information element contained in said data unit notification request or in a packet data protocol context activation request sent from said serving support node to said terminal device to decide whether or not to activate a PDP context on the basis of said information element.

5. A method according to claim 3, wherein said data base push information element contains information
  a) whether or not push services are allowed, and/or
  b) what type of quality of service connection is allowed.

6. A method according to claim 3, wherein said network device push information element contains information derived from the data unit, in particular
  a) an internet protocol address of the data unit source; and/or
  b) an application and/or port number of the data unit source.

7. A method according to claim 1, wherein said data base responds to said network device with said data base push information element contained in said routing information response only if said terminal device is reachable.

8. A method according to claim 1, wherein said network device is a general packet radio services support node, in particular a gateway general packet radio services support node.

9. A method according to claim 1, wherein said network is a general packet radio services network.

10. A method according to claim 1, wherein said data unit is an internet protocol packet.

11. A network device comprising:
  a) generation means for generating a routing information request, the routing information being destined for routing a data unit received by a network device in a network supporting packet switched transmission of data units from the network to a terminal device;
  b) transceiver means for sending said routing information request to a data base storing said routing information and for receiving a routing information response from said data base;
  c) evaluation means for evaluating said routing information response with regard to a data base push information element being stored in said data base, said data base push information element containing information for controlling push services; and
  d) decision means for deciding based on said evaluation of said routing information response whether or not to send a data unit notification request for activating a packet data protocol context to said terminal device or to a serving support node serving said terminal device.

12. A network device according to claim 11, further comprising means for performing a method according to claim 1.

13. A terminal device comprising:
  a) transceiver means for receiving a request for activating said packet data protocol context by sending a corresponding message, and
  b) decision means for deciding whether or not to activate a packet data protocol context, and
  c) evaluation means for evaluating said request with regard to push information element for controlling push services, said element being contained in said request;

d) said decision means being designed to decide whether or not to activate a packet data protocol context on the basis of said push information element.

14. A terminal device according to claim 13, characterized by means for performing a method according to claim 1.

15. A network comprising:
 a) a generation unit configured to generate a routing information request, the routing information being destined for routing a data unit received by a network device in a network supporting packet switched transmission of data units from the network to a terminal device;
 b) a transceiver configured to send said routing information request to a data base storing said routing information and for receiving a routing information response from said data base;
 c) an evaluation unit configured to evaluate said routing information response with regard to a data base push information element being stored in said data base, said data base push information element containing information for controlling push services; and
 d) a decision unit configured to decide based on said evaluation of said routing information response whether or not to send a data unit notification request for activating a packet data protocol context to said terminal device or to a serving support node serving said terminal device.

16. A network device according to claim 15, performing a method according to claim 1.

17. A terminal device comprising:
 a) a transceiver configured to receive a request for activating said packet data protocol context by sending a corresponding message,
 b) a decision unit configured to decide whether or not to activate a packet data protocol context, and
 c) an evaluation unit configured to evaluate said request with regard to push information element for controlling push services, said element being contained in said request;
 d) said decision unit being configured to decide whether or not to activate a packet data protocol context on the basis of said push information element.

18. A terminal device according to claim 17, performing a method according to claim 1.

* * * * *